UNITED STATES PATENT OFFICE.

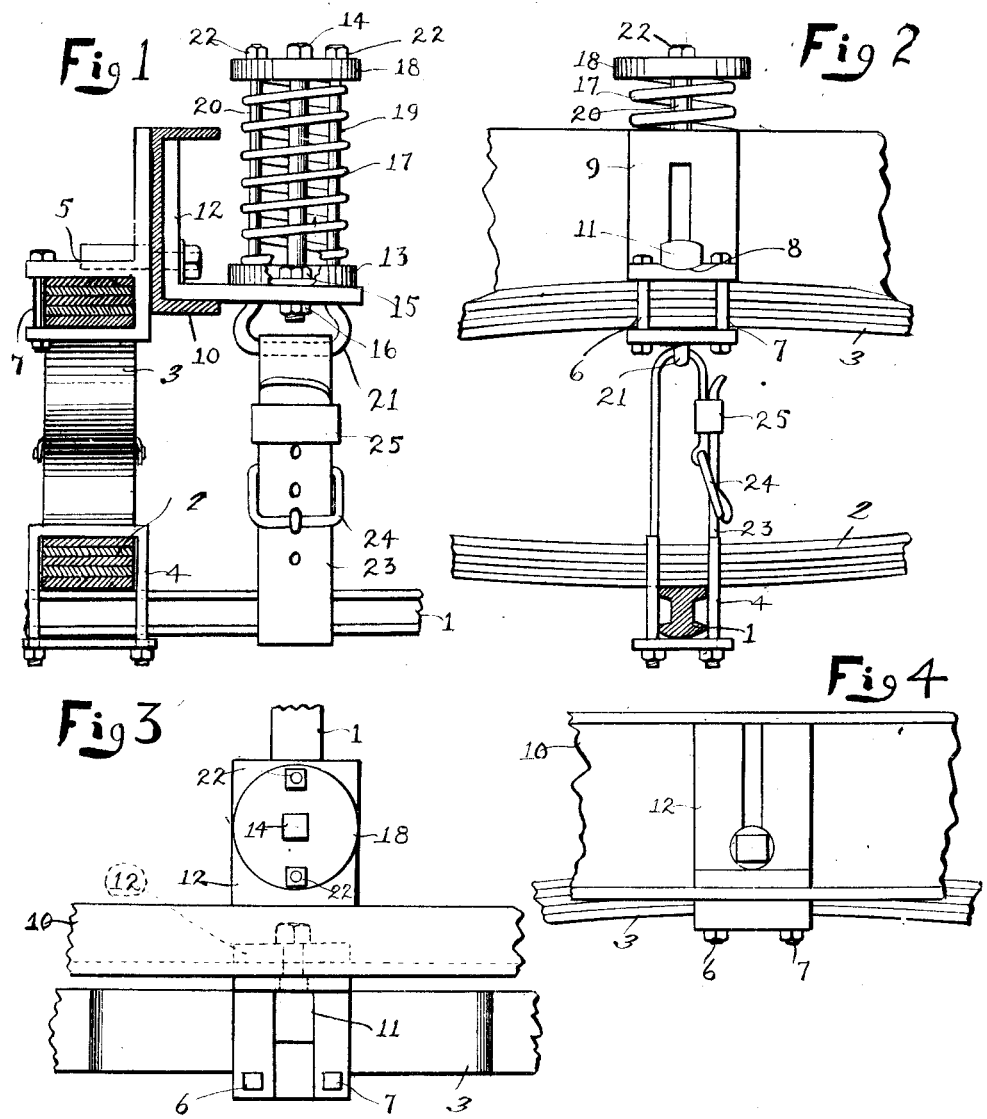

GAYLORD V. BARNES, OF SAN RAFAEL, CALIFORNIA.

SHOCK-ABSORBING DEVICE FOR VEHICLES.

1,053,771. Specification of Letters Patent. Patented Feb. 18, 1913.

Application filed November 9, 1911. Serial No. 659,419.

*To all whom it may concern:*

Be it known that I, GAYLORD V. BARNES, a citizen of the United States, residing at San Rafael, in the county of Marin and State of California, have invented a new and useful Shock-Absorbing Device for Vehicles, of which the following is a specification in such full and clear terms as will enable those skilled in the art to construct and use the same.

This invention relates to a shock absorbing spring for vehicles and is especially adapted for use with automobiles.

It will be understood by those skilled in the art that experiments show that the most satisfactory form of spring for automobiles is some form of a leaf elliptic spring. However, although the leaf elliptic spring seems to be especially adapted to carry a load in compression, it is very liable to breakage when expanded unduly as happens with a rapidly driven automobile when a chuck hole is struck. It, therefore, becomes necessary to provide some auxiliary means for protecting the leaf spring from breakage upon undue upward movements of the vehicle body. Such means must permit a certain movement of the body, however, in order to prevent undue shocks to the occupants as well as injuries to other parts of the machine, and these objects are sought to be obtained in the invention here disclosed.

In the drawings in which the same numeral of reference is applied to the same portion throughout the several views, Figure 1 is a rear elevation, partly in section, of a portion of the supporting axle of a vehicle, the spring for carrying the same, one side frame of the body and the device for preventing injury to the springs. Fig. 2 is a side elevation of the shock absorbing device and the spring to which it is attached. Fig. 3 is a plan view of the device as shown in Fig. 1, and Fig. 4 is a side elevation of the bracket to which the shock absorbing spring is secured, showing the same applied to the side frame of the vehicle.

The numeral 1 represents the axle of a vehicle, 2 the lower portion of a so called full elliptic spring and 3 the upper portion thereof. The spring is suitably secured to the axle by means of a clip 4 and the frame of the vehicle is suitably supported therefrom by means of a bracket 5, said bracket having bolts 6 and 7 to secure the same to the upper limb of the spring. The bracket 5 is provided with a curved seat at 8 and with an upstanding slotted plate at 9. The usual channel frame is shown at 10 and is supported on the top of the spring by means of a heavy bolt 11, said bolt also serving to secure a slotted L shaped bracket 12 on the inner side of the channel side rail 10.

In order to easily place the bracket 12 in position, it is provided with an open slot so that it makes little difference where the bolt 11 is positioned. A horizontal limb on the bracket 12 supports a cap 13, said cap being rigidly secured thereto by means of a bolt 14, having nuts 15 and 16 applied thereto. The cap 13 supports the lower part of a heavy spiral spring 17 while an oppositely placed cap 18 is placed on the top of said spring. Also passing through the spiral spring are two rods 19 and 20, which are formed into a loop 21, at the lower ends thereof, nuts 22 securing them to the upper cap 18. The loop 21 is large enough for the insertion therethrough of a suitable heavy strap 23, said strap having a buckle 24 and loop 25 for the free end thereof.

In operation the spring is loaded with a normal load and the strap 23 is buckled tight around the axle. The vehicle is then ready to be used and since the spring clip cannot lift the spring until it has moved to the top of the slot, there is practically no danger of breaking the elliptic spring, since by the time the frame support reaches the top of said slot the spiral spring will be under such heavy compression that practically no damage can be done the elliptic spring.

Having thus described my invention what I claim as new and desire to secure by Letters Patent of the United States, is as follows:

1. In a shock absorbing device for vehicles, an axle, a spring supported thereby, a vehicle frame supported upon said spring and free to move upwardly from the spring a short distance, a spiral spring supported on the vehicle frame, and means connecting said spiral spring and said axle to prevent the vehicle frame from rising more than a fixed amount, substantially as described.

2. In a shock absorbing device for vehicles, an axle, a spring supported thereby, a vehicle frame supported upon said spring and free to move about the spring a short distance, a bracket secured to said vehicle frame and carrying a spiral spring, a yoke bearing upon the upper end of said spiral spring and a strap passing through said yoke and under the axle to prevent the vehicle frame from moving upwardly more than a fixed amount, substantially as described.

3. In a shock absorbing device for vehicles, an axle, a spring supported thereby, a slotted clip secured to the top of said spring, a vehicle frame having a lug projecting into said slot and normally bearing upon said clip, a spiral spring secured to said vehicle frame and a strap connecting said spiral spring and the axle to prevent the vehicle frame from rising more than a fixed amount, substantially as described.

In testimony whereof I have hereunto set my hand this 2d day of November A. D. 1911, in the presence of the two subscribed witnesses.

GAYLORD V. BARNES.

Witnesses:
C. P. GRIFFIN,
L. H. ANDERSON.